United States Patent
Gaalswyk

(10) Patent No.: US 7,893,366 B2
(45) Date of Patent: Feb. 22, 2011

(54) METHOD OF WEIGH BATCHING FOR SELECTED BATCH FORMULA AND BATCH SIZE

(76) Inventor: Mark K. Gaalswyk, 12 Lakeshore Dr., Sherburn, MN (US) 56171-1183

( * ) Notice: Subject to any disclaimer, the term of this patent is extended or adjusted under 35 U.S.C. 154(b) by 185 days.

(21) Appl. No.: 12/032,934

(22) Filed: Feb. 18, 2008

(65) Prior Publication Data

US 2008/0201006 A1     Aug. 21, 2008

Related U.S. Application Data

(60) Provisional application No. 60/890,726, filed on Feb. 20, 2007.

(51) Int. Cl.
*G01G 13/04* (2006.01)
*G01G 13/06* (2006.01)
(52) U.S. Cl. .......................... 177/116; 177/121; 222/77; 366/141; 700/305
(58) Field of Classification Search ................. 366/141; 177/116–122; 222/55, 56, 77; 141/83; 700/305
See application file for complete search history.

(56) References Cited

U.S. PATENT DOCUMENTS

| | | | | | |
|---|---|---|---|---|---|
| 3,685,602 | A | * | 8/1972 | Mayer | 177/70 |
| 3,708,026 | A | * | 1/1973 | Senour | 177/60 |
| 4,222,448 | A | * | 9/1980 | Sunkle et al. | 177/1 |
| 4,961,887 | A | * | 10/1990 | Crumpler et al. | 264/40.4 |
| 5,340,211 | A | * | 8/1994 | Pratt | 366/141 |
| 6,441,322 | B1 | * | 8/2002 | Ash et al. | 177/116 |
| 7,527,078 | B2 | * | 5/2009 | Driessen et al. | 141/9 |
| 2008/0145466 | A1 | * | 6/2008 | Beane | 425/149 |
| 2008/0201006 | A1 | * | 8/2008 | Gaalswyk | 700/112 |

* cited by examiner

*Primary Examiner*—Randy W Gibson
(74) *Attorney, Agent, or Firm*—Sturm & Fix LLP

(57) ABSTRACT

A method of weigh batching for batch formulae using a number of ingredients conveyed to a weigh hopper by a number of different conveyers. Free fall weights and conveyor delivery speeds for each of the ingredients and each of the conveyors used to convey each ingredient are stored in a control system memory. The stored information is used to prepare batches of various formulated products optimizing both the weigh up time and the ingredient weight accuracy.

3 Claims, 1 Drawing Sheet

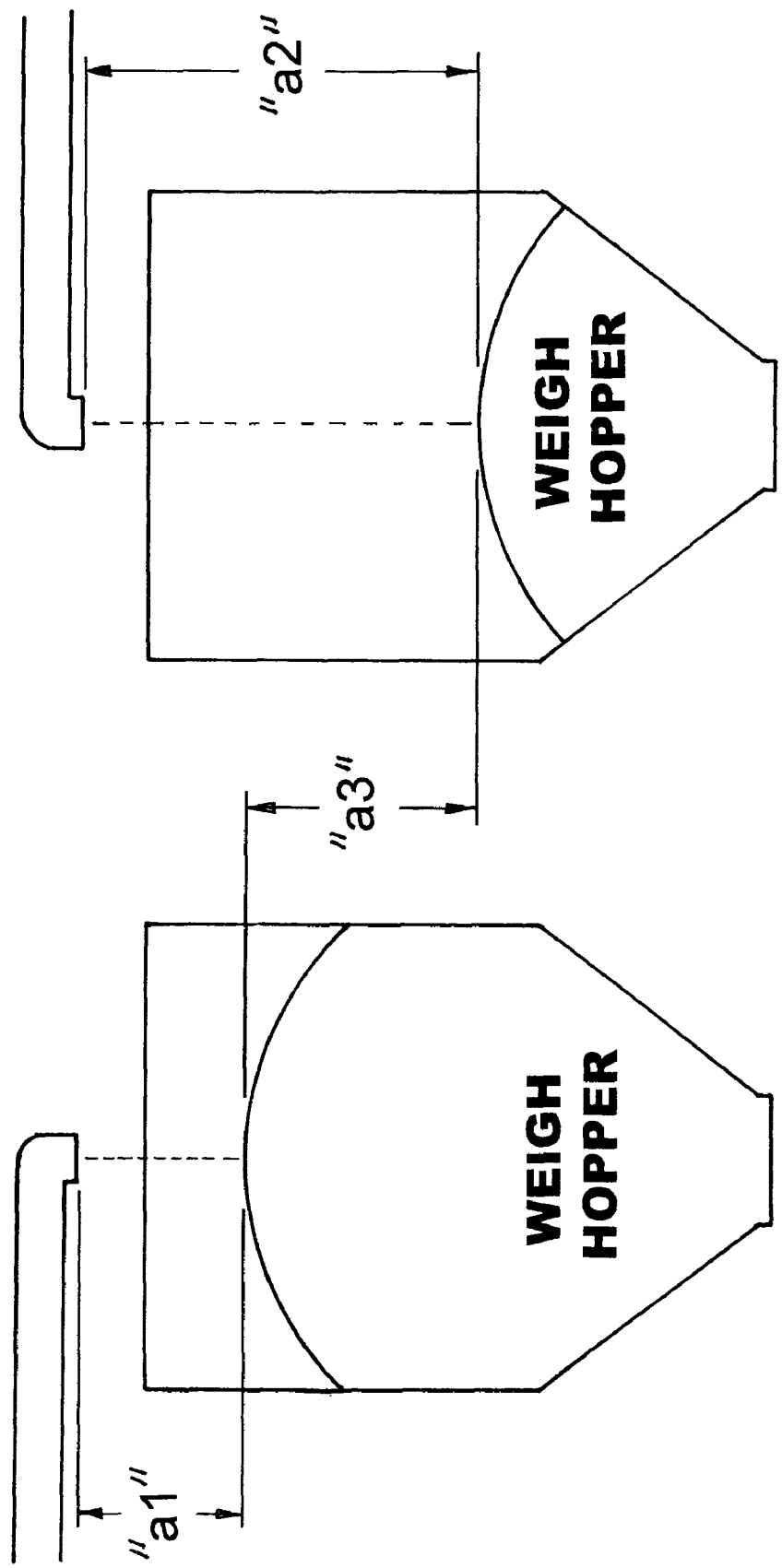

METHOD OF WEIGH BATCHING FOR SELECTED BATCH FORMULA AND BATCH SIZE

CROSS REFERENCE TO RELATED APPLICATIONS

This application claims the benefit of U.S. Provisional Patent Application Ser. No. 60/890,726 filed Feb. 20, 2007 entitled "Weigh Batching", which is incorporated herein by reference.

BACKGROUND OF THE INVENTION

1. Field of the Invention

The present invention relates to the field of automatic weighing devices, and more particularly to a weighing device for ingredients combined in a batch.

2. Description of Related Art

In the batch weighing field, accuracy of a mixture is often affected by the material in mid-air that falls onto the weighing platform after the conveying device is deactivated. Since most weigh batching devices tend to deactivate after an ingredient weight is determined on the scale, the end result is an "over shoot" of the desired target weights to be included of an ingredient caused by the mid-air ingredients to fall onto the scale and add additional weight. Also, traditional systems are often continuously trading off the improvement in speed obtained by an ingredient being conveyed into a batch at a high rate, and improvements in weigh-up accuracy achieved by conveying an ingredient very slowly.

In the batch weighing field, a method of auto free fall adjustment has been the widely used method of improving the accuracy of a weighing up ingredients in a weigh batching system. This widely used industry method utilizes a concept whereby the conveying device delivering material to the weigh platform is deactivated by the control system in advance of the desired weight for an ingredient being actually achieved on the scale. This then allows the material in mid air to continue to fall and the weight of this "mid air" material to be accumulated in the total weight of the batch. After the material falls on to the scale, the computer will observe the additional weight that fell after the conveying device was deactivated and use this as a "free fall" weight that will be stored in a computer memory or other data storage device and then utilized and subtracted from the desired final target weight for that ingredient when it is used subsequently. The end result is that the system will then, on subsequent operations of this ingredient's conveying mechanism, pre-actively deactivate motion early—thus allowing for the estimated pre-determined mid air ingredient free fall weight to accumulate on the scale and the desired final weight of the ingredient to be more closely achieved.

In addition to a weighing device deactivating a conveyor earlier by a "free fall or pre-act weight", some weighing systems will alter the speed of the conveying device as the desired target weight is approached. This allows an ingredient to be delivered at a very high speed rate to a scale platform during the initial weigh-up of an ingredient, but as the target weigh is approached, the system will set the speed at a much slower rate which will further improve accuracy because the system is delivering ingredient to the scale platform at a much slower rate during final ingredient cut off.

There has existed a need for a new and improved automatic weighing device that can better compensate for variations in the manner by which ingredients are combined in a batch.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a schematic view illustrating variations in free fall weights for the same ingredient in different batch formulae.

BRIEF SUMMARY OF THE INVENTION

Briefly stated, the present invention provides a method of weigh batching for batch formulae using a number of ingredients conveyed to a weigh hopper by a number of different conveyers. Free fall weights and conveyor delivery speeds for each of the ingredients and each of the conveyors used to convey each ingredient are stored in a control system memory. The stored information is used to prepare batches of various formulated products optimizing both the weigh up time and the ingredient weight accuracy.

DETAILED DESCRIPTION OF THE INVENTION

This invention dramatically improves upon any prior practices in the weigh batching art by improving upon the final accuracy by utilizing a method whereby these free fall weights and conveying device delivery speeds are stored in the control systems memory or other data storage in a multi dimensional data storage table by ingredient and by each conveyor that can be used to convey that ingredient. Thus, as each ingredient may use different conveyors that may be used in different formula types, as that ingredient is used in a formula id, and as that ingredient is used in a final batch size, the exact "free fall" weights are stored in memory for every combination of these variations. Thus, the ideal free fall weight and motor speed combinations for each different situation is stored in memory and recalled for use versus the previous industry practice of just one for each ingredient.

From the free fall weight improvement portion of the improvement, the reason this improvement is significant is that different formulas will have different size piles upon the scale when the ingredient is added. (see FIG. 1, a1 versus a2) Thus, even though a free fall weight might have been precisely determined and stored the last time the ingredient was used, because this time the pile height is different—the total accumulated weight will be different from the ideal target weight by the difference in the weight of the ingredient contained in the height the ingredient has to fall (see FIG. 1, a3).

From the conveyor setting portion of this inventions improvement, both the initial high speed setting and the final low speed setting can be altered and stored by ingredient, as the ingredient is conveyed in a particular conveyor, used in a formula type, as the ingredient is used in a formula id, and as the ingredient is used in a final batch size. As an example of this, if one formula calls for an inclusion of 1000 pounds of an ingredient and the next formula calls for only 10 pounds of that same ingredient, without the addition of the method described in this invention, the conveying device may have started at a conveying speed delivery rate of say 100 pounds per second with 50 pounds of free fall, when only 10 pounds of that same ingredient was needed. This would have forced the control system to try and deactivate the conveying mechanism before any weight would have even touched the weighing platform.

The method described in this invention would have instead allowed the user to define a high speed conveying rate of (as an example) 100 pounds per second for that ingredient when the formula type, formula and batch size where such that 1000 pounds was required in the batch; but when the formula type, formula, and batch size was 10 pounds, the system could have been configured to start at a rate of say 1 pound per second and then move to a slower speed during the final delivery of the ingredient of say 0.1 pounds per second and a free fall 0.1 pound.

The method practiced in this invention will instead allow the user to store these free fall weights and ingredient conveyor high and low speed rates by ingredient and for each of the various conveyors and changes that can cause variation in pile height and amount of ingredient included in the batch including formula type, formula, and batch size. The user is allowed to define in a control system set up screen to what amount of accuracy the free fall compensation and speed control accuracy data storage is desired.

In order to automate the configuration of the system, the method as practiced by the invention will not only automatically smarten itself by changing free fall weights by a defined percentage as better experience in weigh up is obtained, but the method will also allow the user to allow the system to automatically alter ingredient speeds to optimize both the weigh up speed of the batch and also the final accuracy. This is achieved by having the computer control system automatically change the high speed settings stored in the multi-dimensional table to maximize weigh up time and automatically change the low speed setting stored in the multi-dimensional data table to maximize weigh up accuracy.

To aid in user set up, the defaults are stored in the upper most level and then will roll down into the greater detail level as elected by the user in the set up screen as batches are weighed up and experience is realized in levels of different conveyors, formula types, different formulas and different batch sizes of that formula.

The end result of practicing the invention as described above is a system that is much more accurate than traditional weigh batching methods and a system that is weighing up as quickly as possible while still maximizing accuracy.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A method of weigh batching for batch formulae prepared with a plurality of ingredients conveyed to a weigh hopper by a plurality of conveyors, the method comprising the steps of:
   storing a plurality of batch formulae in a control system memory, each of the plurality of formulae having a plurality of ingredients;
   storing free fall weights and conveyor delivery speeds for each of the plurality of ingredients and for each of the plurality of conveyors used to convey each ingredient as each ingredient is used in each of the plurality of batch formulae and a plurality of batch formulae batch sizes; and
   utilizing stored information for the batch formulae, free fall weights and conveyor delivery speeds to prepare batches of formulated products of a selected one of the plurality of batch formulae in a selected one of the plurality of batch formulae batch sizes.

2. The method of claim 1 wherein the conveyor delivery speeds include high speed settings for optimizing weigh up time, and low speed settings for optimizing ingredient weight accuracy.

3. The method of claim 2, further including the step of modifying the stored free fall weights by a predetermined percentage based on actual weights of ingredients used in prior batches of formulated products.

* * * * *